UNITED STATES PATENT OFFICE.

WILLIAM C. TAYLOR, OF CORNING, NEW YORK, ASSIGNOR TO CORNING GLASS WORKS, OF CORNING, NEW YORK, A CORPORATION OF NEW YORK.

GLASS.

1,192,474.      Specification of Letters Patent.      Patented July 25, 1916.

No Drawing. Application filed September 17, 1914, Serial No. 862,252. Renewed December 27, 1915. Serial No. 68,920.

*To all whom it may concern:*

Be it known that I, WILLIAM C. TAYLOR, a citizen of the United States of America, and a resident of Corning, New York, have invented certain new and useful Improvements in Glass, of which the following is a specification.

My invention relates to a composition for the production of a glass of a low expansion co-efficient, and inasmuch as one of the uses had in view for this glass is the manufacture from it of culinary vessels, my invention also contemplates the production of a glass of a low expansion and of high stability.

Glasses of very low co-efficient expansion can be obtained by formulæ now known, but the difficulty experienced in such compositions is that if their expansion co-efficient is sufficiently low for the practical purposes, their temperature of fusing is so high as to preclude their economical working, and prevent their use for the manufacture of ware which I have in mind. I have discovered, however, that the addition of a small amount of lithia reduces the temperature of fusion of a glass mixture to a very great degree, and that this is so pronounced that although lithia has a high expansion factor, still it can be used in such small quantities as not to appreciably increase the expansion co-efficient of the mixture, while at the same time, materially reducing the fusing temperature. I have further discovered that lithia in the composition which I herein describe is of value in increasing the stability of the glass, although the glass herein referred to is a boro-silicate of very low expansion. Glasses of such compositions, especially when of high boric acid contents, are generally unstable, and subject to decomposition.

The following are examples of the compositions of several glasses made in accordance with this invention:—

|  | A. | B. | C. |
|---|---|---|---|
|  | % | % | % |
| $SiO_2$ | 71 | 75 | 70 |
| $B_2O_3$ | 28 | 15 | 13 |
| $Li_2O$ | 1 | 1 | 9 |
| $Al_2O_3$ |  | 5 | 2 |
| $Na_2O$ |  | 4 |  |
| $Sb_2O_3$ |  |  | 6 |

The expansion co-efficient of composition "A" above named, I have found to be .0000029, of B, .0000040, and of C, .0000056. It will be noted that all of the above compositions contain a comparatively large per cent. of boric oxid; and that all of them are boro-silicates. Glasses made from compositions of the formulæ above given are extremely useful in the manufacture of glass articles exposed to extreme variation of temperature and to attacks by steam or other chemical action, this being by reason of their low co-efficient of expansion and their stability.

The presence of the alumina in compositions B and C is useful in preventing crystallization during melting and working.

Having thus described my invention, what I claim and desire to secure by Letters Patent is:—

1. A glass containing silica, boric oxid and lithia, in the proportions specified, and having a co-efficient of expansion of less than .0000056.

2. A glass containing silica, boric oxid, lithia and alumina and having a co-efficient of expansion of less than .0000056.

In testimony whereof I hereunto affix my signature in the presence of two witnesses.

WILLIAM C. TAYLOR.

Witnesses:
E. C. SULLIVAN,
G. WILLIS DRAKE.